United States Patent [19]

Taniguchi et al.

[11] Patent Number: 4,851,868
[45] Date of Patent: Jul. 25, 1989

[54] FLASH DEVICE FOR USE IN PHOTOGRAPHY

[75] Inventors: Nobuyuki Taniguchi, Tondabayashi; Keiji Yamazaki, Sakai; Hiroshi Hosomizu, Nara; Makoto Kamiya, Sakai; Kenji Tsuji, Amagasaki, all of Japan

[73] Assignee: Minolta Camera Kabushiki Kaisha, Osaka, Japan

[21] Appl. No.: 170,363

[22] Filed: Mar. 18, 1988

Related U.S. Application Data

[62] Division of Ser. No. 811,876, Dec. 20, 1985, Pat. No. 4,743,929.

[30] Foreign Application Priority Data

Dec. 25, 1984 [JP] Japan .................................. 59-278594
Dec. 26, 1984 [JP] Japan .................................. 59-281761
Dec. 26, 1984 [JP] Japan .................................. 59-281762
Dec. 26, 1984 [JP] Japan .................................. 59-281763

[51] Int. Cl.$^4$ ............................................ G03B 15/05
[52] U.S. Cl. .............................. 354/127.1; 354/149.1
[58] Field of Search ................... 354/421, 126, 127.1, 354/127.11, 127.12, 127.13, 149.1, 141; 315/241 P; 362/5, 16, 17, 18

[56] References Cited

U.S. PATENT DOCUMENTS 4,423,940 1/1984 Kashihara et al. ............... 354/149.1
4,462,666 7/1984 Orban .................................. 354/126
4,512,644 4/1985 Yoshida ........................... 354/149.1
4,743,929 5/1988 Taniguchi et al. ............... 354/127.1

FOREIGN PATENT DOCUMENTS 35761977 1/1977 Japan .

OTHER PUBLICATIONS

Brochure concerning VIVITAR Flash Systems.

Primary Examiner—W. B. Perkey
Attorney, Agent, or Firm—Burns, Doane, Swecker & Mathis

[57] ABSTRACT

A flash device for use in association with a camera is disclosed. The camera provides focal length data representing a focal length of a lens mounted on the camera to the flash device. The flash device comprises a body portion, a flash head pivotally mounted on the body portion, a xenon tube provided in the flash head for emitting a flash light, and a lens is provided in front of the light emitting means movably to change the angle of the cone of the flash light. A driving circuit, controlled by a microcomputer, is provided for driving the lens in response to the focal length data to set the angle of the cone of the flash light correspondingly to the focal length. A pivot detector is provided for detecting the pivotal movement of the flash head. When the pivotal movement is detected, the microcomputer controls the driving circuit so as not to drive the lens but to maintain the lens, during and after the pivotal movement, in the same position as it was before the pivotal movement.

3 Claims, 9 Drawing Sheets

| Fig. 1a | Fig. 1b |

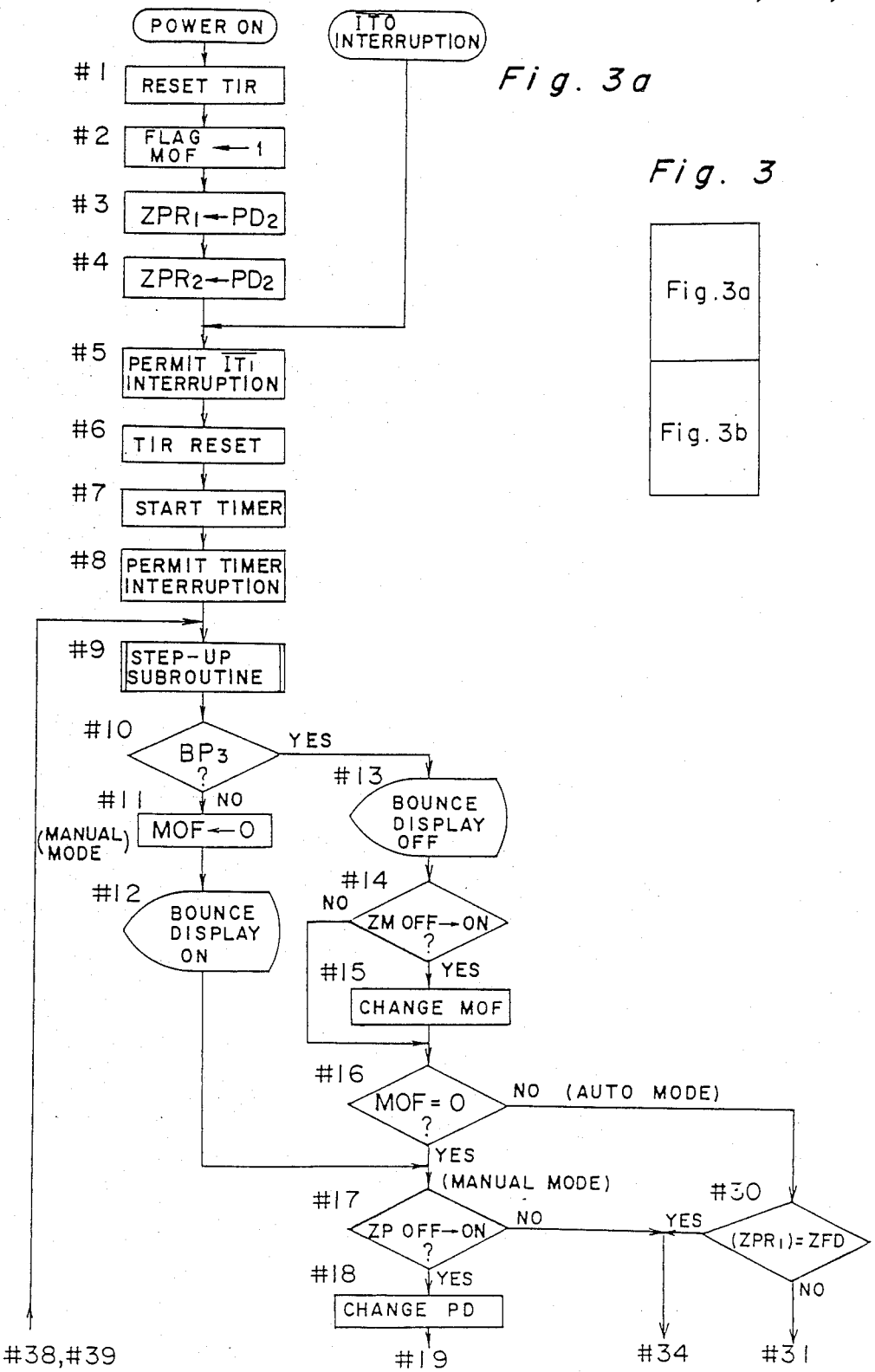

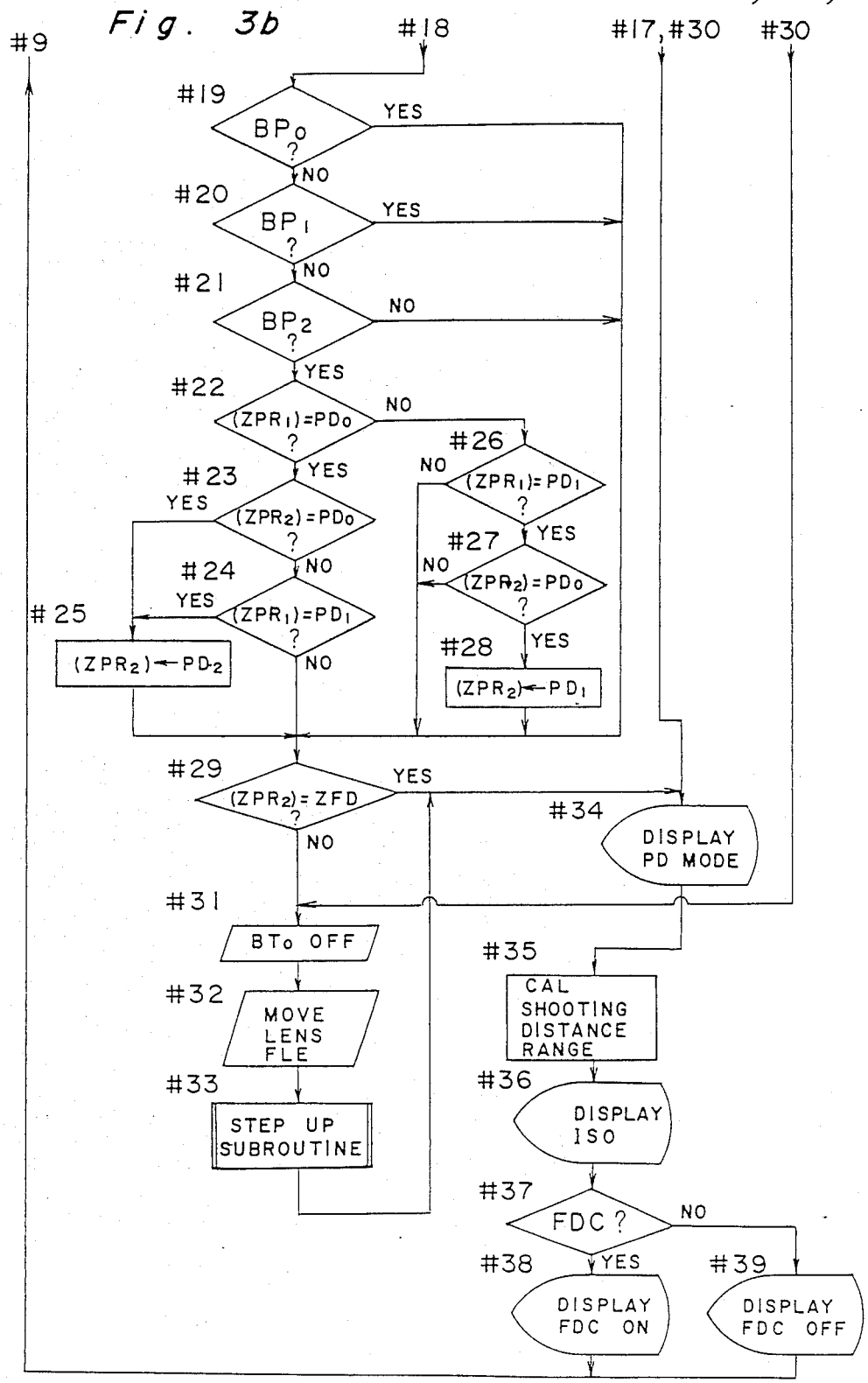

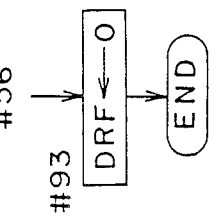
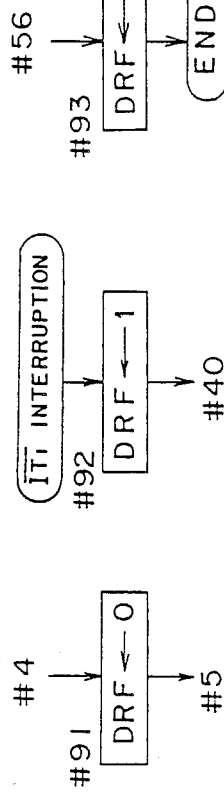
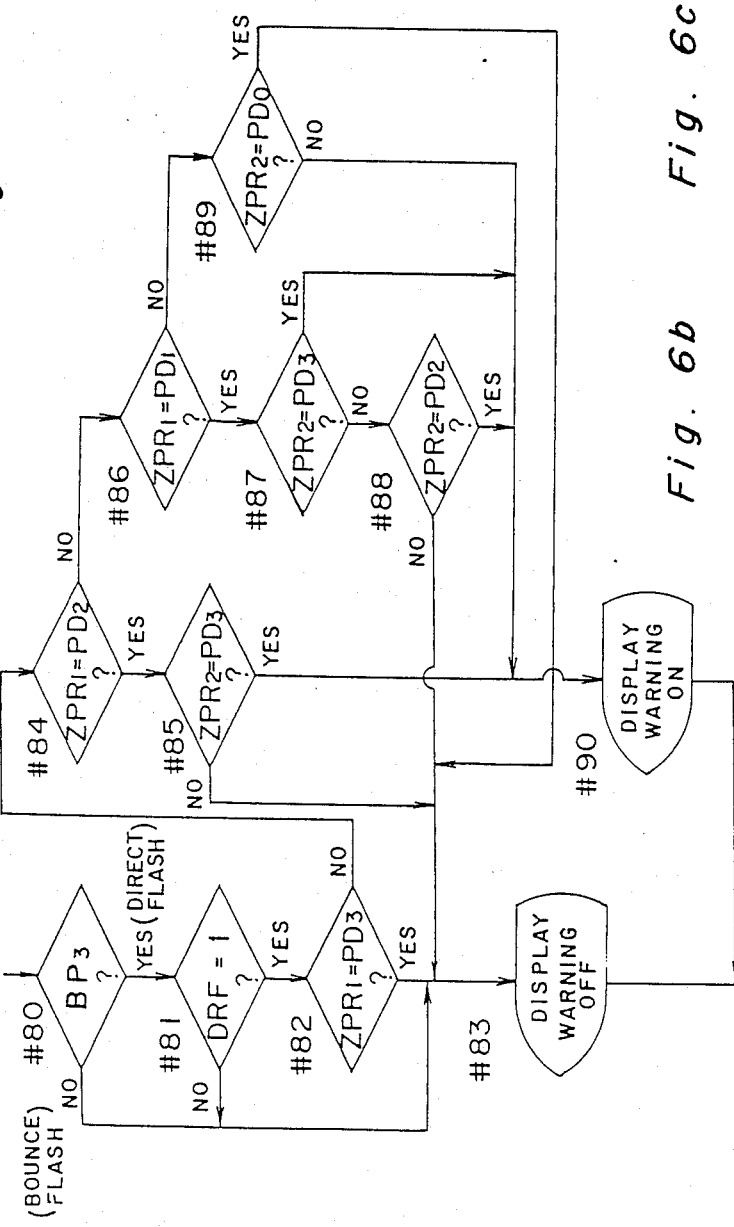

FLASH DEVICE FOR USE IN PHOTOGRAPHY

This application is a division of application Ser. No. 811,876 filed Dec. 20, 1985, now U.S. Pat. No. 4,743,929.

BACKGROUND OF THE INVENTION

1. Field of the invention

The present invention relates to a flash device for use in photography and, more particularly, to a flash device which is mountable on a camera body and may change not only the direction of light emission, but also the angle of the cone of light manually to a desired angle of the cone of light, or automatically in response to the change of the focal length of the camera lens.

2. Description of the Prior Art

A flash device of the above described type has been proposed and is disclosed, for example, in U.S. Pat. Nos. 4,512,644, 4,423,940 and 4,462,666. According to U.S. Pat. No. 4,512,644, a lens is movably mounted in front of the light emitting element. The lens may move between a home position and an extended position so that the angle of the cone of light emitted by the light emitting element may be varied. The lens is moved by a motor automatically based on the focal length of the camera lens. If the focal length of the camera lens changes, such as in the case of a zoom lens, the lens mounted on the light emitting element moves accordingly so that the angle of the cone of light emitted by the flash device will be approximately the same as the photographic frame as defined by the camera lens.

Also, according to this reference, the flash head, in which the light emitting element is incorporated, can be pivoted to change the direction of emission of flash light. When the flash head is in the normal position, i.e., a direct flash mode position, the flash light is emitted parallel to the optical axis of the camera lens so as to illuminate the object directly by the flash light. When the flash head is pivoted to a bounce flash mode position, the flash light is emitted towards the ceiling to illuminate the object by the light which has bounced on the ceiling.

According to this reference, when the flash head is pivoted to the bounce flash mode position, the lens no more changes its position with respect to the change of the focal length, but it will be automatically moved to the home position so as to provide the widest angle of the cone of light. Then, when the flash head is pivoted back to the direct flash mode position, the lens will be moved again to the position based on the focal length of the mounted camera lens. The prior art flash devices have the problems given below.

By the pivotal movement of the flash head to the bounce flash mode, the lens is suddenly moved to the home position. When one is not aware of this, one may be surprised by such a sudden movement of lens FLE. Thus, one may drop the camera set. This will more likely happen when one tries to pivot the flash head to the bounce flash position by simultaneously grasping the front face, where the lens is mounted, and the rear face of the flash head with one's hand. In this case, if the lens was in the extended position before the pivot, the flash head may easily fall from one's hand when the lens suddenly moves to the home position during and/or after the pivot.

Also, when one tries to pivot back the flash head to the direct flash position by simultaneously grasping the front face and the rear face of the flash head with one's hand, the motor drive mechanism for driving the lens may be damaged. This can be explained as follows. When the flash head is pivoted back to the direct flash position, the motor drive mechanism automatically operates to push out the lens to a position determined by the focal length of the mounted camera lens. However, because one's hand is holding the lens, the motor might be burned out or the gears might be stripped.

Another problem may be encountered when the flash device is used in the bounce flash mode. When the flash head is pivoted towards the ceiling, for example 65°, and if a wide angle camera lens, such as a 28 mm lens, is mounted on the camera body, the light emitted from the flash device partly illuminates directly the object which is located within the photographing frame. This will result in an unbalanced lighting. The same can be said also of a flash device which has a fixed angle of the cone of light.

Yet another problem may arise when the position of the lens can be manually changed. If the camera lens mounted on the camera body is a wide angle lens, and if the angle of the cone of light emitted from the flash device, which is in the direct flash mode, is narrow as happens when the lens on the flash device is moved out, the object in the photographing frame may not be illuminated evenly by the flash light. This will also result in an unbalanced lighting.

A further problem arises when the flash device is used in combination with a ultra-wide lens, such as a 20 mm lens. If the flash device can emit light as wide as the area corresponding to a view that can be taken by a 28 mm lens, the use of the flash device in combination with such an ultra-wide lens (20 mm lens) will result in an unbalanced lighting.

The prior art is still seeking an improved flash device with the above problems being effectively removed.

SUMMARY OF THE INVENTION

The present invention has been developed with a view to substantially solving the above described problems and has for its essential object to provide an improved flash device.

It is also an essential object of the present invention to provide an improved flash device which does not make an automatic movement during or immediately after the pivotal movement of the flash head.

It is a further object of the present invention to provide an improved flash device which prohibits the setting of the flash device in the modes which result in the unbalanced lighting, or produces a warning when such a setting is selected.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 3a and 3b, taken together as shown in FIG. 3, illustrate a flow chart operation carried out by a microcomputer provided in the flash device;

FIG. 3c is a flow chart illustrating a detail of a step-up subroutine included in the flow chart of FIG. 3a;

FIGS. 6a, 6b, 6c and 6d are flow charts illustrating portions of the flow chart shown in FIG. 3, according to a third modification thereof.

DESCRIPTION OF THE PREFERRED EMBODIMENTS

1. Preferred Embodiment

Figures 1, 1A:
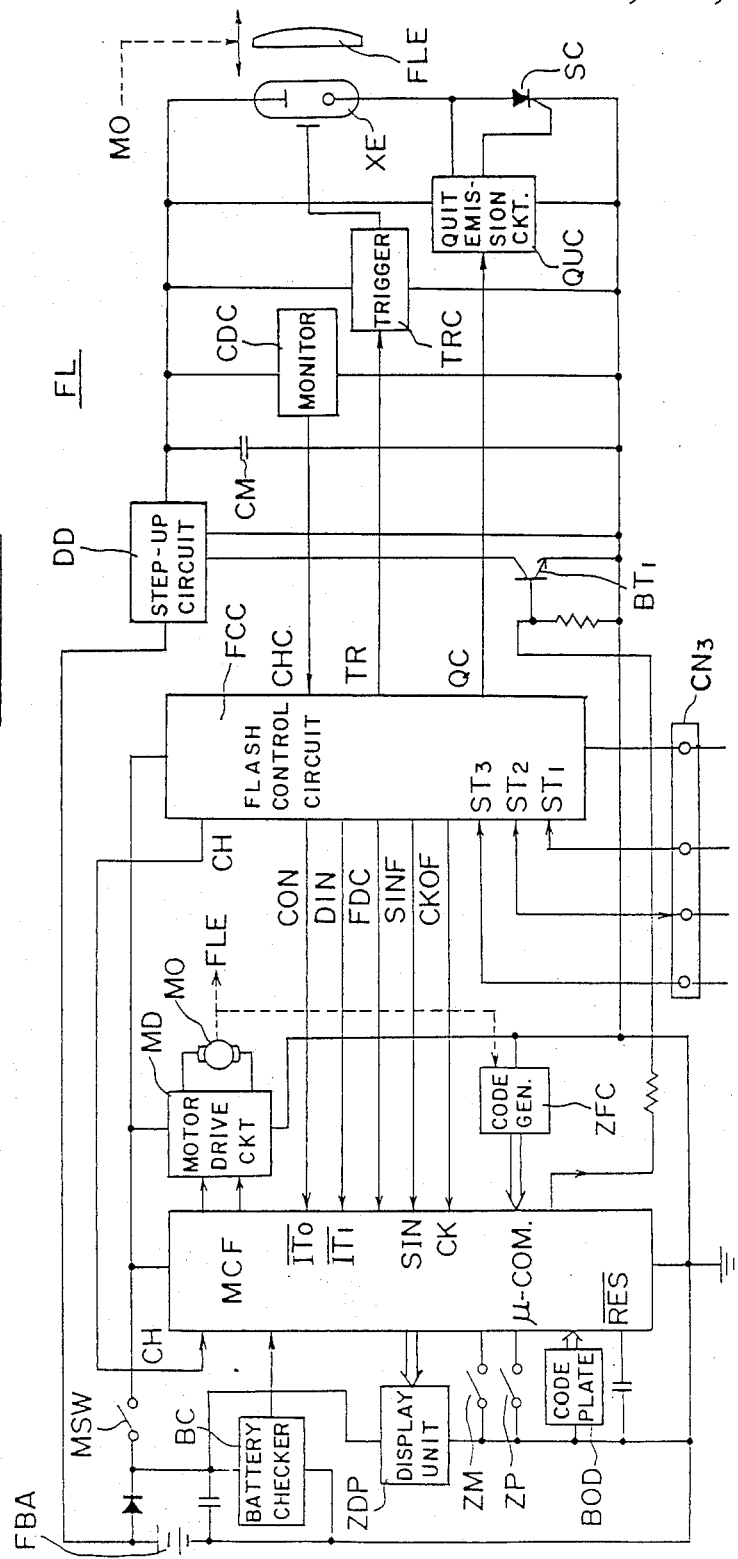
FIGS. 1a and 1b, taken together as shown in FIG. 1, illustrate a circuit diagram of a camera system according to the present invention.
Figure 1B:
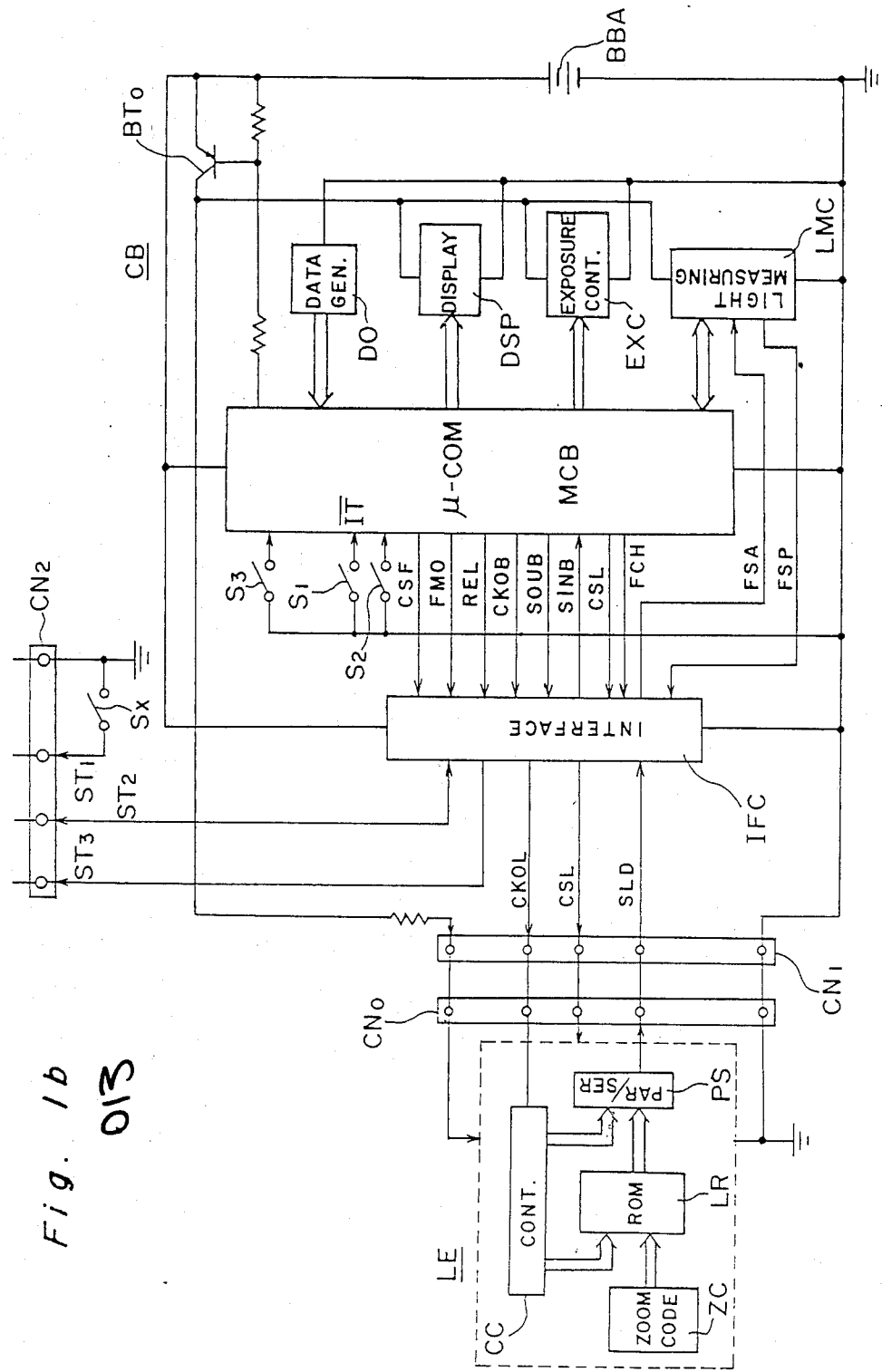

Referring to FIGS. 1a and 1b, a circuit diagram of the camera system according to the present invention is shown. The circuit comprises a camera circuit CB (FIG. 1b) provided in the camera body (not shown), a lens circuit LE provided in an exchangeable zoom lens (not shown) to be mounted on the camera body, and a flash circuit FL (FIG. 1a) provided in a flash device. Lens circuit LE and camera circuit CB are connected to each other through connectors CN0 and CN1. Also, flash circuit FL and camera circuit CB are connected to each other through connectors CN2 and CN3. Thus, these circuits CB, LE and FL operate dependently on each other.

Figure 2:
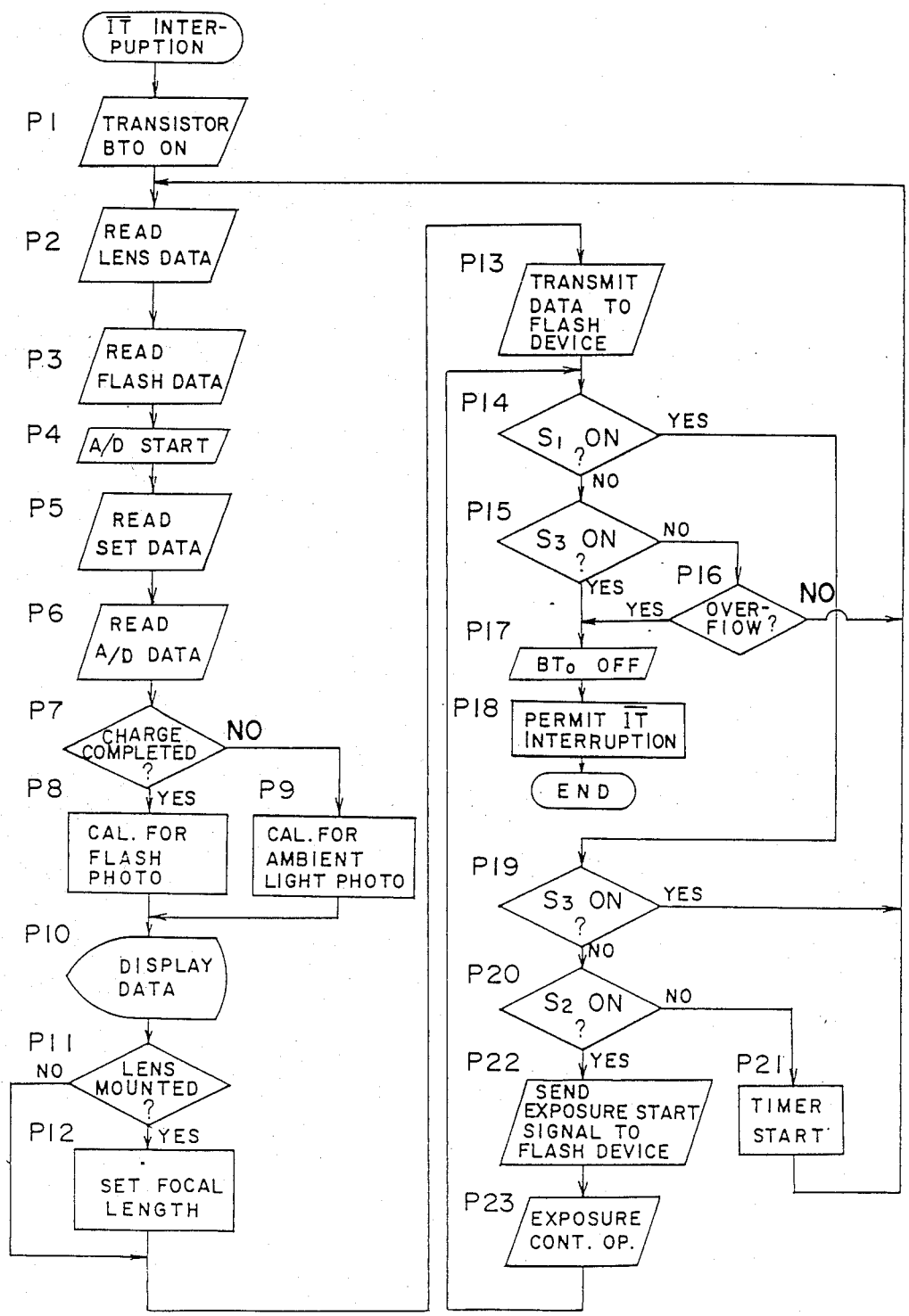
FIG. 2 is a flow chart illustrating an operation carried out by a microcomputer provided in the camera body.

Referring to FIG. 2, a flow chart is shown for controlling the operation of a microcomputer MCB (FIG. 1b) provided in camera circuit CB. Furthermore, in FIGS. 3a-6d flow charts are shown for controlling the operation of a microcomputer MCF (FIG. 1a) provided in the camera body. In the description below, the reference characters used for designating the terminals are also used for indicating the signals produced from such terminals.

In camera circuit CB, when a shutter release button (not shown) is depressed halfway, a light measuring switch S1 turns on to provide a LOW level signal to an interruption terminal IT of microcomputer MCB. Thus, microcomputer MCB starts its operation from step P1. At step P1, a transistor BT0 turns on to supply electric power through a suitable protection resistor to lens circuit LE and also to a display circuit DSP, an exposure control circuit EXC and a light measuring circuit LMC provided in camera circuit CB.

Then, at step P2, microcomputer MCB receives data from lens circuit LE. First, microcomputer MCB produces a HIGH level signal from its terminal CSL, and then, produces 8 clock pulses (1 byte) from its terminal CKOB, thereby enabling the serial-in and serial-out operation of an interface circuit IFC with respect to lens circuit LE. At this time, since a terminal CSL of interface circuit IFC is producing a HIGH level signal, the lens circuit is in the active condition. Thus, in response to the clock pulses generated from a terminal CKOL, which are generated in response to the clock pulses from terminal CKOB, a data with a plurality of bits is produced parallelly from control circuit CC and, in turn, from ROM LR. The parallel data read out parallelly from ROM LR is converted to a serial data by a parallel/serial converter PS and is transmitted through terminal SLD and interface circuit IFC, to a serial-in terminal SINB of microcomputer MCB. Thereupon, microcomputer MCB stores the 1-byte data in a certain storing area.

In the mean time, lens circuit LE operates such that each time 1-byte data is produced, control circuit CC changes the address signal inputted to ROM LR to sequentially carry out the data reading. When the lens mounted to the camera body is a zoom lens, a zoom code plate ZC is provided which produces a zoom code data that varies relatively to the zooming operation of the lens. The zoom code data is combined with the data from control circuit CC to form a particular address signal, which is used for addressing the ROM. In this manner, the data sent from the lens to the camera body are: fully opened aperture size; minimum opened aperture size; change in the aperture size caused by zooming; focal length (f) of the lens; and a check data indicating that the lens is mounted.

When the data reading from lens circuit LE completes, microcomputer MCB starts to receive data from flash circuit FL (step P3). This is done in the following procedure. Microcomputer MCB produces LOW and HIGH level signals, respectively, from terminals CSL and CSF, and at the same time, a positive going pulse having a pulse width of T0 from terminal FMO. This pulse is transmitted through interface circuit IFC to terminal ST3 to a flash control circuit FCC. Upon receipt of this signal, flash control circuit FCC is in a condition ready to produce data and, at the same time, terminal CON produces a HIGH level signal to activate microcomputer MCF if it is in the inactive condition.

Then, microcomputer MCB in the camera body produces a HIGH level signal from its terminal FCH to make interface circuit IFC ready to receive serial data from the flash device. In a synchronized relationship with the clock pulses transmitted through terminal ST3 to flash control circuit FCC, 1-byte data is sent out serially from terminal ST2 of circuit FCC. This 1-byte data is transmitted through interface circuit IFC and a serial-in terminal SINB to microcomputer MCB. In this manner, the data, such as a data indicating that the main switch MSW is on, a data indicating the completion of the electric charge in a capacitor CM and an FDC signal (described later) are transferred from the flash device to the camera body.

The completion of the electric charge in a capacitor CM is detected by a monitor circuit CDC which produces a signal when a voltage across capacitor CM increases higher than a predetermined voltage. The monitor circuit CDC has hysteresis characteristics. That is, monitor circuit CDC generates the signal when the voltage across capacitor CM is higher than a first predetermined level, and stops the generation of the signal when the voltage across the capacitor CM becomes lower than a second predetermined level, which is lower than the first predetermined level.

The FDC signal is generated in the following manner. When a xenon tube XE emits light in response to a trigger signal from a trigger circuit TRC, the camera circuit produces, when the xenon tube has already emitted a sufficient light to the object to be photographed, a stop emission signal before xenon tube XE completes its full emission. In other words, whenever a stop emission signal is produced, that means that the sufficient lighting is effected to the object to be photographed. In such a case the FDC signal having a predetermined pulse duration is produced from flash control circuit FCC to the camera circuit immediately after the closing of an X-contact (Sx). The X-contact opens in response to the complete scan of a leading curtain of a shutter mechanism, and closes in response to the complete scan of a trailing curtain of the shutter mechanism.

When all the necessary data for the initial setting are transferred from the flash circuit, the program advances to step P4 for the preparation of the photographing under a particular condition. First, terminals CSF and FCH produce LOW level signals to start the operation of A/D converter provided in light measuring circuit LMC (step P4). Then, from data generator DO, various data, such as data representing exposure control mode, exposure time, aperture value, ISO value, are applied to microcomputer MCB. Then, the A/D converted data from light measuring circuit LMC is transmitted.

Light measuring circuit includes an ambient light measuring circuit for measuring the ambient light, an A/D converter for the A/D conversion of the signal produced from the ambient light measuring circuit, and a flash light measuring circuit for measuring the flash light. The flash light measuring circuit starts the integration of measuring light in response to a LOW level signal from a terminal FSA. When the integrated amount reaches a level determined by the ISO value (film speed), it produces the stop emission signal (a HIGH level signal) which is applied to terminal FSP.

Then, at step P6, microcomputer MCB receives the A/D converted data of the output data of the ambient light measuring circuit. In the next step P7, based on the data from the flash circuit, it is detected whether or not the flash device is ready for the light emission. If the flash device is ready, the program goes to step P8 to calculate necessary data for the flash photographing. If the flash device is not ready, the program goes to step P9 to calculate necessary data for photographing under the ambient light. Then, at step P10, the calculated values and the selected modes are displayed through a display unit DSP. In the next step P11, it is detected whether or not a lens is properly mounted by the check data. If the lens is properly mounted, the focal length data is renewed with a focal length data (f) now being read. If the lens is not properly mounted, or no lens is mounted, the program goes to step P13 with no change in the data. These data are then transmitted to flash circuit FL.

The data transmission is carried out in the following manner. First, a terminal CSF produces a HIGH level signal, and also terminal FMO produces a positive going pulse have a pulse width of T1, which is transmitted through interface IFC to terminal ST3. Upon receipt of this pulse, flash control circuit FCC produces a pulse from its terminal DIN to make microcomputer MCF in a condition ready to receive data. Then, flash control circuit FCC is set in a condition for producing, from a terminal CKOF, the clock pulses applied to terminal ST3, and producing, from a terminal SINF, the data applied to terminal ST2.

Microcomputer MCB provided in the camera body has terminals CSF and FCH, which are now producing HIGH and LOW level signals, respectively. Then, a terminal SOUB serially produces data of: a control aperture value; a photographing mode (selected from program mode, aperture priority mode, shutter speed priority mode, and manual mode) in combination with a film speed (ISO value); and a focal length of the camera lens. Each of these data is 1-byte (8-bit) long. The data produced from terminal SOUB are applied to interface IFC which then serially sends the data through terminal ST3 to microcomputer MCF in the flash device, in a synchronized manner with the clock pulses produced from terminal ST2 (step P13).

When this operation completes, the program goes to step P14 at which it is detected whether or not light measuring switch S1 is turned on. If it is turned on, the program goes to step P19 at which the condition of switch S3 is detected. Switch S3 turns on when the exposure control operation completes and, it turns off when the exposure control mechanism (not shown) is loaded to a charged condition. Thus, when switch S3 is still on, the exposure control mechanism is not completely loaded to the charged condition. In this case, the program returns back to step P2 to repeat the same operation, as described above.

On the contrary, when switch S3 is off, indicating that the exposure control mechanism is completely loaded to the charged condition, the program goes to step P20 at which it is detected whether or not a switch S2 is turned on. Switch S2 turns on when the shutter release button is depressed fully. If switch S2 is not turned on, the program goes to step P21 for starting a timer to count a predetermined period of time. The timer is provided for holding power supply. After step P21, the program returns to step P2.

At step P20, when it is detected that release switch S2 is on, exposure start signal is sent to flash circuit FL (step P22) in such a manner that a terminal CSF produces a HIGH level signal and, at the same time, a terminal FMO produces a positive going pulse with a pulse period of T2. The pulse from terminal FMO is transmitted through terminal ST3 to a flash control circuit FCC, which then resets FDC signal to make the flash device ready for light emission. Then, microcomputer MCB produces LOW and HIGH level signals from terminals CSF and REL, respectively, thereby starting the exposure control operation (step P23) by exposure control circuit EXC. At this time, since microcomputer MCB is producing a HIGH level signal from terminal REL, interface IFC is in a condition to transmit data from the flash device through terminal ST2 to terminal FSA, and also to transmit data back from terminal FSP through terminal ST3 to the flash device.

During when no data communication is effected, flash control circuit FCC in the flash device produces from its terminal ST2, a HIGH level signal when a capacitor CM is not completely charged, and a LOW level signal when capacitor CM is completely charged. Then, when the signal representing the turn on of X-contact (Sx) is transmitted through terminal ST1, the signal from terminal ST2, if terminal ST2 is now producing a HIGH level signal, is changed to a LOW level signal. Since terminal REL of microcomputer MCB is producing a HIGH level signal, interface circuit IFC transmits the signal sent from terminal ST2 to terminal FSA. Thus, light measuring circuit LMC starts to integrate the measured light in response to the step down of the signal from terminal FSA.

In the flash circuit, if capacitor CM is charged, flash control circuit FCC produces, upon receipt of the signal representing the turn on of X-contact (Sx), a trigger signal from its terminal TR to a trigger circuit TRC. Thus, xenon tube XE starts to emit light, and thyristor SC starts to conduct. Then, in light measuring circuit LMC, when the integrated amount reaches a predetermined amount determined by the ISO value, circuit LMC produces an stop emission signal which is transmitted through terminal FSP, interface circuit IFC and terminal ST3 to flash control circuit FCC. Flash control circuit FCC determines whether or not the stop emission signal is produced before counting a predetermined period from the closure of X-contact (Sx). If the stop emission signal is produced before such a predetermined period, flash control circuit FCC transmits the stop emission signal from a terminal QC to a quit emission circuit QUC and, at the same time, it remembers that such a stop emission signal is produced, for example, by setting up a flag. Then, quit emission circuit QUC immediately disables thyristor SC to stop the light emission from xenon tube XE. Thereafter, when X-contact (Sx) opens in response to the completion of the exposure control operation, i.e., to the completion of the scanning of the trailing curtain, terminal FDC of flash control circuit FCC produces a HIGH level signal (FDC signal) for a predetermined period of time, and applies the FDC signal to microcomputer MCF. During the time the FDC signal is being produced, flash control circuit FCC also produces, from its terminal ST2, FDC pulse repeatedly for a predetermined number of times. The FDC pulses are applied to microcomputer MCB in the camera body. Thus, microcomputer MCF is informed by the FDC signal that the light emitted from the flash device was sufficient for photographing the object. The same information is supplied to microcomputer MCB by the FDC pulses.

The exposure control operation described above is done in step P23. When the exposure control operation is over, the program goes to step P14, at which it is detected whether or not light measuring switch S1 is turned on. If switch S1 is on, the program goes to step P19 to detect switch S3. If switch S3 is also on, the program returns back to step P2. At step P14, if light measuring switch S1 is off, the program goes to step P15 to detect switch S3. At this time, since switch S3 is on, indicating that the exposure control mechanism is not loaded to the charged condition, the program goes to step P17 to turn transistor BT0 off. Then, at step P18, the interruption $\overline{IT}$ is permitted, meaning that the procedure of interruption $\overline{IT}$ may be started any time when it is requested, and then, this program ends.

On the contrary, if light measuring switch S1 turns off after the exposure control mechanism is loaded to the charged condition, i.e., after the turn off of switch S3, the program goes to step P16 to detect whether a timer for counting a predetermined time (for example, 10 seconds) has been overflowed or not. If the timer is overflowed, the operation ends, but if not, the program repeats steps P2-P13-P16.

Referring to FIGS. 3a and 3b, the flow chart shows the operation carried out by microcomputer MCF (FIG. 1a) of flash circuit FL. When a main switch MSW is turned on manually, microcomputer MCF is supplied with electric power which then produces an auto-reset signal from its reset terminal $\overline{RES}$ to start the operation from step #1. In order to prevent the peripheral circuits connected to microcomputer MCF from being operated by the turn on of main switch MSW, the outputs of microcomputer MCF are controlled by microcomputer MCF.

At step #1, a register TIR provided in microcomputer MCF is reset. Register TIR is provided in association with a timer for counting the time to control the time length, such as 10 minutes, in which microcomputer MCF is maintained on. Then, at step #2, "1" is stored in flag MOF indicating the automatic mode. In other words, whenever the power is turned on, the flash device is first automatically set to the automatic mode. Under the automatic mode, a lens FLE provided in front of xenon tube XE moves telescopically in and out automatically to change the angle of the cone of light emitted by the flash device in accordance with the change of the focal length of the camera lens, for example, by the zooming operation or lens exchange operation of the camera lens. If "0" is set in flag MOF in the later stage, it indicates that the mode is set to the manual mode. Under the manual mode, lens FLE moves in and out step-by-step by a number of times a switch ZP is turned from off to on. The mode change between the automatic and manual modes can be done by the turn on of a switch ZM. If switch ZM is turned on for the first time, the mode is changed from automatic to manual. If switch ZM is turned on again, the mode changes from manual to automatic.

As described above, the mode is initially set to the automatic mode. Thus, "1" is set in flag MOF (step #2). At step #3, a register ZPR1 provided in microcomputer MCF is temporarily stored with a lens position data PD2, as an initial data for the automatic mode, representing that lens FLE is to be located in the second extended position so that the angle of the cone of flash light is appropriate for the camera lens having a focal length between 50 to 70 millimeters. In the later stage, i.e., at step #45 in $\overline{IT1}$ interruption procedure, the lens position data to be stored in register ZPR1 may be changed to any one of the four different data PD0, PD1, PD2 and PD3. When the data stored in register ZPR1 is PD0, lens FLE stays at a home position such that lens FLE is located very close to xenon tube XE. When the data in register ZPR1 changes to PD1, PD2 or PD3, lens FLE will be advanced, away from xenon tube XE, to first, second or third extended positions, respectively. Under the automatic mode, the data PD to be stored in register ZPR1 changes automatically (step #45) with respect to the change of focal length of the camera lens. Thus, in the case of the zoom lens, the zooming will automatically result in the change of position of lens FLE in steps. Each step-out position covers a different range of focal lengths of camera lens, as shown in Table 1 below.

TABLE 1

| Data in ZPR1 | Step-out Position of Lens FLE | Focal Length Range of Camera Lens |
| --- | --- | --- |
| PD0 | Home P. | 28–35 mm |
| PD1 | 1st Extended P. | 35–50 mm |
| PD2 | 2d Extended P. | 50–70 mm |
| PD3 | 3d Extended P. | above 70 mm |

In the case where the mounted camera lens has the focal length less than 28 millimeters, register ZPR1 will be stored with data PD0 and, at the same time a warning is produced. A detail of such a warning will be described later.

Then, at step #4, a register ZPR2 provided in microcomputer MCF is temporarily stored with the same lens position data PD2, as an initial data for the manual mode.

Under the manual mode, each time switch ZP is turned on, the data stored in register ZPR2 changes. For example, when the data stored in register ZPR2 is PD2, a single depression of switch ZP changes the stored data from PD2 to PD3. Switch ZP is a normally-off switch which returns to off when the depression is removed. Then, if another depression is applied to switch ZP, the stored data will change from PD3 to PD0.

When the procedure up to step #4 is completed, step #5 enters to permit the $\overline{IT1}$ interruption. Step #5 may also be entered by an $\overline{IT0}$ interruption in a manner described below.

If no $\overline{IT0}$ interruption is initiated, the program follows the steps of: step #5 to permit the $\overline{IT1}$ interruption; step #6 to reset register TIR; step #7 to start the timer for counting, e.g., 10 minutes; step #8 to permit a timer interruption; and the cycling of steps #9–#38 (or #39) for a number of times until the counter counts up the 10 minutes. After 10 minutes from the turn on of main switch MSW, microcomputer MCF automatically stops its operations to stay in an inactive condition. Its operation is restarted when any data is transmitted from the camera circuit to flash control circuit FCC. When flash control circuit FCC receives any data from the camera circuit, a HIGH level signal is transmitted from its terminal CON to terminal $\overline{IT0}$ of microcomputer MCF. When terminal $\overline{IT0}$ detects the trailing edge of the pulse CON, microcomputer MCF accepts the $\overline{IT0}$ interruption to restart the procedure from step #5. Thus, microcomputer MCF starts its operation for another 10 minutes. The $\overline{IT0}$ interruption is accepted not only when the microcomputer MCF is in the inactive condition, but also when it is in the active condition. Thus, for example, when any data from the camera circuit is transmitted to flash control circuit FCC during the operation of microcomputer MCF, the timer starts to count another 10 minutes from the transmittal of the data. Thus, the period of time in which the microcomputer operates is prolonged.

At step #5, $\overline{IT1}$ interruption is permitted. The detail of the $\overline{IT1}$ interruption will be described later in connection with FIG. 3d. But, here, it is to be noted that whenever the $\overline{IT1}$ interruption is carried out, the data in register ZPR1 is changed to a data corresponding to the focal length of the mounted camera lens. In other word, by detecting the data in register ZPR1, it is possible to detect the focal length of the mounted camera lens, as done at step #22 or #26.

At step #6 register TIR is reset and at step #7 the timer starts to count up the predetermined time, such as 10 minutes, as described above. Then, at step #8, a timer interruption is permitted. The timer interruption is initiated after every predetermined time, such as after every one second, during the cycling of the main routine of steps #9–#38 (or #39). The timer interruption is provided for counting the 10 minutes and for cutting, after counting the 10 minutes, the power to a motor for driving lens FLE and ending the program. The detail of the timer interruption will be described later in connection with FIG. 3e.

At step #9, a step-up subroutine for controlling a procedure related to the charging of capacitor CM is carried out. The detail of the step-up subroutine is described below.

Figure 3D:
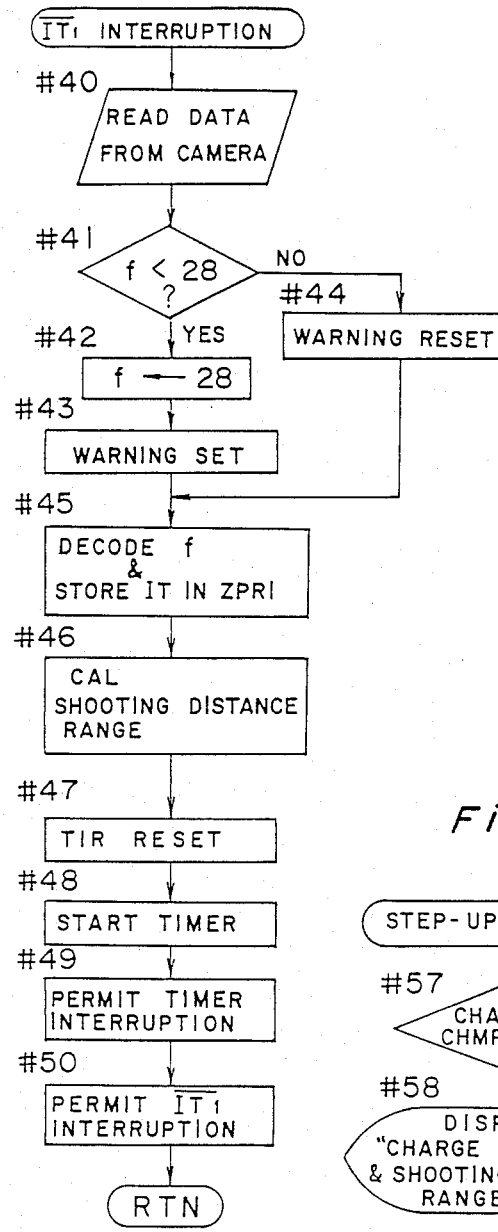
FIG. 3d is a flow chart illustrating a detail of an IT1 interruption procedure.
Figure 3E:
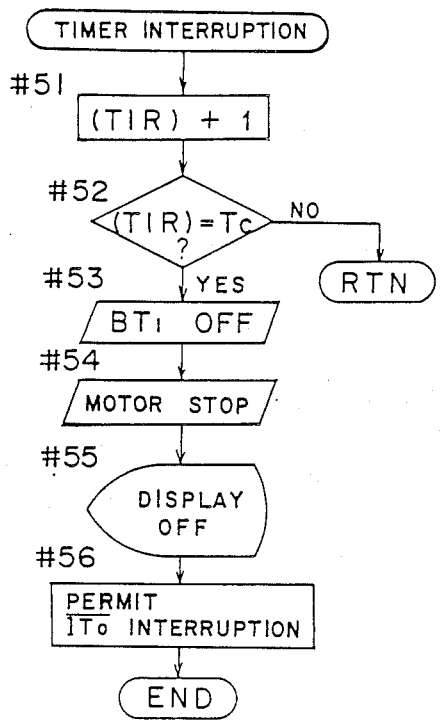
FIG. 3e is a flow chart illustrating a detail of a timer interruption procedure.
Figure 3C:
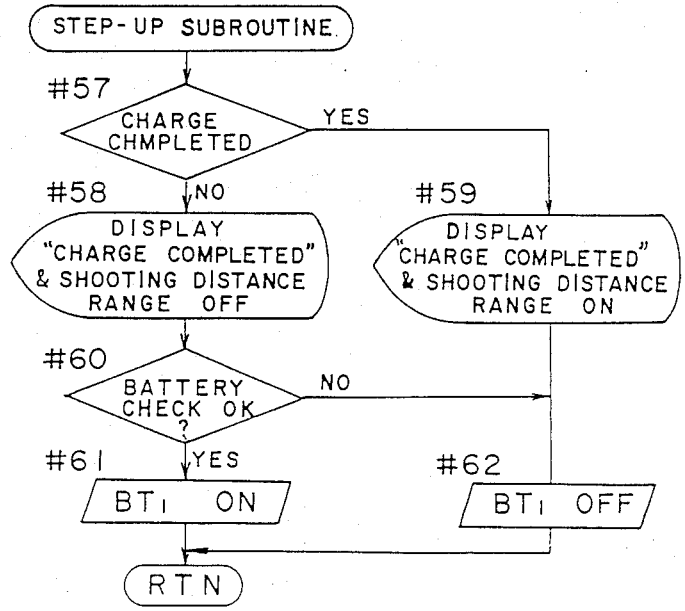

Referring to FIG. 3c, when the step-up subroutine starts, it is detected at step #57 whether or not capacitor CM is charged up to the required voltage. If the capacitor is charged to the required level, the program goes to step #59 for displaying "charge completed" and also displaying the shooting distance range through a display unit ZDP. An object to be photographed in such a shooting distance range can be photographed with an appropriate lighting by the flash light. Thereafter, a transistor BT1 which supplies a power to a step-up circuit DD is turned off (step #62) to disable the step-up circuit. Then, the subroutine ends, and the procedure returns back to the main routine.

At step #57, if the capacitor is not charged to the required level, prohibit the display of "charge completed" and also of the shooting distance range through display unit ZDP (step #58). Then, at step #60, it is detected whether the voltage across battery FBA is sufficient to properly operate various circuits connected to main switch MSW, or not. This detection is done by a signal applied to microcomputer MCF from a battery checker BC which detects the voltage across the battery BC. If it is detected that the voltage across the battery is insufficient, transistor BT1 is turned off (step #62). On the contrary, if it is detected that the battery is still supplying the sufficient voltage, transistor BT1 is maintained on and, thereafter, the procedure returns back to the main routine.

Returning back to FIG. 3a, after the step-up subroutine, it is detected at step #10 whether the flash light device is set in a direct flash mode or a bounce flash mode, which are described below.

Figure 7:
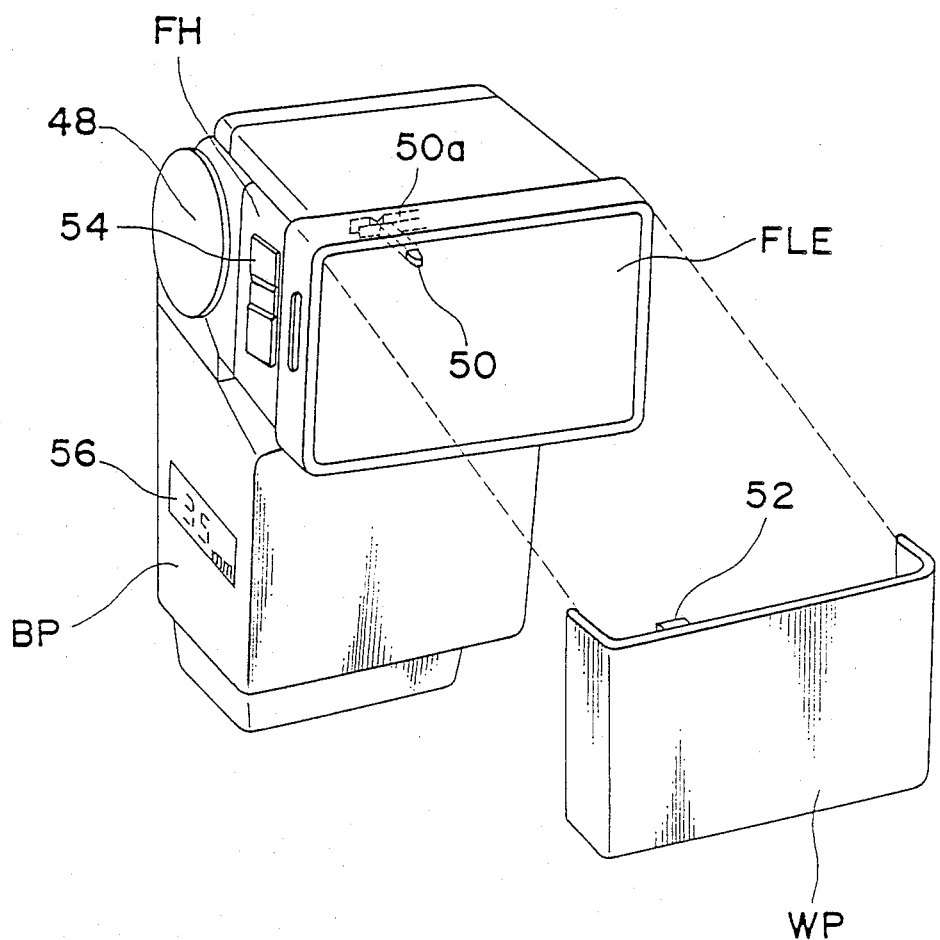
FIG. 7 is a perspective view illustrating a flash device according to the present invention.

The flash light device according to one embodiment of the present invention is shown in FIG. 7, which comprises a body portion BP which may be fixedly mounted on a camera body, and a flash head FH pivotally connected to the body portion. The flash head is pivoted manually about a shaft 48 towards the ceiling to present the bounce flash mode at three difference angles 65°, 75° and 90° with respect to the optical axis of the camera lens. Such an angle is referred to as a bounce angle. When the bounce angle is 0°, the flash light is emitted parallel to the optical axis of the camera lens to present the direct flash mode. The data representing the bounce angle is generated by a code plate BOD (FIG. 1a) provided in association with the flash head. The angle data generated from code plate BOD are shown in Table 2 below, each representing different bounce angle.

TABLE 2

| Angle Data | Bounce Angle |
|---|---|
| BP0 | 90° |
| BP1 | 75° |
| BP2 | 65° |
| BP3 | 0° |

At step #10, if it is detected that the angle data is other than BP3, meaning that the bounce flash mode is selected, the program goes to step #11 to store "0" in flag MOF to forcibly place the flash device in the manual mode. Then, at step #12, a display indicating the bounce flash mode is effected. Thereafter, the program goes to step #17.

On the contrary, at step #10, if it is detected that the angle data is BP3, meaning that the direct flash mode is selected, the program goes to step #13 to prohibit the display of bounce flash. Then, at step #14, it is detected whether or not the mode switch ZM, for changing the mode between automatic mode and manual mode, is depressed. If mode switch ZM is depressed, mode change is effected at step #15. If mode switch ZM is not depressed, step #15 is skipped. As is apparent from the above description, under the direct flash mode, either the automatic or manual mode can be selected. But, under the bounce flash mode, only the manual mode is possible as forcibly selected by the program.

Then, at step #16, it is detected whether the selected mode is a manual mode (MOF=0) or an automatic mode (MOF=1). If it is a manual mode, the program goes to step #17, and if automatic mode, the program goes to step #30.

At step #17, it is detected whether or not switch ZP for changing the position of lens FLE is depressed. Lens FLE moves in and out, step-by-step, by the number of times a switch ZP is depressed. If switch ZP is depressed once, the PD data stored in register ZPR2 is changed by one step in a manner described above in connection with Table 1.

After step #18, the program proceeds to steps #19-#21 (FIG. 3b) at which the angle data is detected. If the angle data is other than BP2, that is either BP0, BP1 or BP3, the program proceeds to step #29. But, if the angle data is BP2 indicating that the bounce angle is 65°, the operation is carried out through steps #22-#28 to restrict the possible extended position of lens FLE with respect to different focal lengths of the camera lens. Such a restriction is shown in Table 3, in which an X represents an improper choice and an O represents a proper choice.

TABLE 3

| Focal Length (f) | Position of Lens FLE | | | |
|---|---|---|---|---|
| | PD0 | PD1 | PD2 | PD3 |
| 28-35 mm | X | X | O | O |
| 35-50 mm | X | O | O | O |
| 50-70 mm | O | O | O | O |
| above 70 mm | O | O | O | O |

Such a restriction is required, because in the case where the flash head is set to bounce angle 65°, the light emitted from the flash device partly illuminates directly the object which is within the photographing frame when a wide angle lens (28-35 mm) is used, and when lens FLE is positioned at PD0 or PD1. Such a combination should be avoided and, therefore, it is not proper to use. The same can be said when a wide angle lens (35-50 mm) is used and when lens FLE is positioned at PD0.

Thus, at step #22, it is detected whether or not the focal length of the mounted camera lens corresponds to data PD0, i.e., if it is between 28 mm and 35 mm. If yes, the program goes to step #23 to detect whether or not the set PD data in register ZPR2 for the manual mode is PD0. If the set PD data in register ZPR2 is not PD0, it is further detected at step #24 whether or not the set PD data in register ZPR2 for the manual mode is PD1. In this manner, through steps #23 and #24, if it is detected that the set data in register ZPR2 is neither PD0 nor PD1, the program goes to step #29. If it is detected that the set data n register ZPR2 is either PD0 or PD1, the program goes to step #25 to forcibly set data PD2 in register ZPR2. Thus, through steps #22-#25, the setting of data PD0 or PD1 is prohibited when the mounted lens has a focal length between 28 mm and 35 mm.

At step #22, if it is detected that the mounted camera lens does not have a focal length between 28 mm and 35 mm, a further detection is carried out in step #26 whether or not the mounted camera lens has a focal length between 35 mm and 50 mm. If the mounted lens has a focal length other than 35-50 mm, the program goes to step #29. But, if the mounted lens has a focal length between 35 mm and 50 mm, the program goes to step #27 to detect whether or not the set PD data in register ZPR2 is PD0. If the set PD data is other than PD0, the program goes to step #29. But, if the set PD data is PD0, data PD1 is forcibly set in register ZPR2 (step #28) and, thereafter, the program goes to step #29.

The above restriction of the step-out position of lens FLE is necessary when the flash head is pivoted to set the bounce angle of 65°, i.e., when the angle data is BP2. However, when the flash head is pivoted to another bounce angle, such as 75° or 90°, no direct light will intrude into the frame, provided that the focal length of the camera lens is greater than 28 mm. Thus, for the angle data BP0 or BP1, it is not necessary to consider the restriction of the step-out position of lens FLE.

At step #29, it is detected whether or not the data stored in register ZPR2 coincides with the data ZFD generated from a code generator ZFC provided in association with lens FLE for producing a signal representing the step-out position of lens FLE. If the two data coincide, the program goes to step #34, and if not, the program goes to step #31.

Returning back to step #16, when it is detected that the mode is the automatic mode, the program goes to step #30 for the comparison between the data stored in register ZPR1 and the data ZFD generated from code generator ZFC. If the two data coincide, the program goes to step #34, and if not, the program goes to step #31.

At step #31, transistor BT1 is turned off to cut power to step-up circuit DD thereby enabling a quick power supply to a motor drive circuit MD in the next step and yet maintaining the output battery power stable. At step #32, motor MO is operated to move lens FLE in accordance with the data stored in is register ZPR1 (if it is the automatic mode), or the data stored in register ZPR2 (if it is in the manual mode). After the lens movement, the program goes to step #33 for carrying out the step-up subroutine, which is already described in connection with FIG. 3c. Then, the program goes to step #34.

At step #34, auto/manual mode and step-out position of lens FLE are displayed. Then, at step #35, equations (1) and (2) below are calculated using the data of: Ivmax representing the maximum amount of light that can be emitted; Ivmin representing the minimum amount of light that can be emitted; Av representing the controlled aperture value transmitted from the camera circuit; and Sv representing the film speed ISO.

$$Ivmax + Sv - Av = Dvmax \tag{1}$$

and $$Ivmin + Sv - Av = Dvmin \tag{2}$$

The calculated results, Dvmax and Dvmin, represent the maximum and minimum distances for providing a sufficient light to the object.

Then, at step #36, the film speed ISO is displayed through display device ZDP. Also, if the FDC signal is present, FDC is displayed indicating that the sufficient light is emitted to the object (steps #37 and #38). If the FDC signal is not present, the FDC display is canceled (step #39). Thereafter, the program returns back to step #9 to repeat the main routine described above.

As has been described above, in the main routine, regardless of automatic or manual mode, when the bounce flash is chosen, the mode is automatically set to the manual mode. Also, the step-out position of lens FLE is maintained the same before and after the turning of the flash head from direct flash position to bounce flash position. The step-out position of lens FLE can be changed only when switch ZP is depressed. Also, when the flash head is turned from the bounce flash position to the direct flash position, the mode stays in the manual mode. Therefore, lens FLE stays in the same position even after the flash head is returned to the direct flash position. It is needless to say that lens FLE stays in the same position even when the flash head is turned from one bounce flash position to another bounce flash position. Therefore, even when the operator pivots the flash head, lens FLE never moves due to such a pivoting of the flash head. Therefore, the operator will not be surprised by the sudden or unexpected movement of lens FLE. Furthermore, the motor drive mechanism for moving lens FLE may not be damaged, which might be caused by the motor drive operation while the operator is grabbing the flash head.

It is possible to pivot the flash head and, at the same time, depress switch ZP to move lens FLE. But this will not happen under the normal operation, because switch ZP is so arranged as not to be easy to be depressed, such as on the back of the flash device and within a narrow groove so that one has to use his finger nail to depress switch ZP. Therefore, practically, the pivotal movement of the flash head and the in and out movement of lens FLE do not take place at the same time.

Next, a case where a camera lens having a focal length shorter than 28 mm will be described with reference to the flow chart shown in FIG. 3d.

When flash control circuit FCC (FIG. 1a) receives at terminal ST3, a pulse having a pulse duration of T1, flash control circuit FCC produces from its terminal DIN a positive going pulse which is applied to terminal $\overline{IT1}$ of microcomputer MCF. In response to the trailing edge of the positive going pulse, microcomputer MCF temporarily stops its operation and starts the $\overline{IT1}$ interruption shown in FIG. 3d.

Referring to FIG. 3d, at step #40, the data from the camera circuit is read in the following manner. In a synchronized relationship with the clock pulses transmitted through terminals ST3 and CKOF of flash control circuit FCC to terminal CK, microcomputer MCF reads 3-byte data from the camera circuit transmitted serially through terminals ST2 and SINF of flash control circuit FCC to terminal SIN. Then, at step #41, it is detected whether or not the data representing the focal length of the mounted lens, as just read, is less than 28 mm. If it is less that 28 mm, the program goes to step #42 to change the focal length data so that it now represents the focal length of 28 mm. Thereafter, a warning signal is set (step #43). On the contrary, at step #41, if it is detected that the mounted lens has a focal length not less than 28 mm, the warning signal is reset (step #44).

When a warning is produced based on the warning signal set at step #43, it indicates that, under the direct flash mode, the flash light will not cover the entire object in the frame, or that, under the bounce flash mode, the flash light emitted from the flash device may possibly partly illuminate directly the object in the frame.

The warning may be produced in other cases. For example, under the direct flash mode while under the manual mode, the warning may be produced when the flash light with the selected step-out position of lens FLE can not cover the entire object in the frame. Furthermore, under the bounce flash mode while under the manual mode, instead of prohibiting the combinations of position of lens FLE and the focal length (steps #22–#28), as indicated by Xs in Table 3, such combinations may be permitted, but with a generation of warning at steps #25 and #28. On the contrary, under the direct flash mode while under the manual mode, instead of producing the warning, it is possible to restrict the position of lens FLE that can be set manually.

It is to be noted that under the direct flash mode while under the manual mode, the above-described restriction of lens positioning or generation of warning should be carried out only when the reading of data from the camera circuit is carried out at least once after the turning on of main switch MSW. If such a warning or restriction is carried out before the first data reading from the camera circuit, the flash device may result in the error operation, or make unreasonable restriction in the selection of a combination, because the initial data temporarily stored in the flash circuit may be different from the data in the camera circuit.

The flash device according to the present invention may be used in combination with a camera which does not have any data transfer means for transferring data to the flash device. Also, it may be used separately or disconnected from the camera.

The above mentioned warning or restriction may be given to the combinations shown by Xs in Table 4 below.

TABLE 4

| Focal | Position of Lens FLE | | | |
|---|---|---|---|---|
| Length (f) | PD0 | PD1 | PD2 | PD3 |
| 28–35 mm | O | X | X | X |
| 35–50 mm | O | O | X | X |
| 50–70 mm | O | O | O | X |
| above 70 mm | O | O | O | O |

In Table 4, Os represent possible combinations.

Referring to FIG. 3d, at step #45, the data representing the focal length of the mounted lens as read in from the camera circuit is decoded in accordance with Table 1 to select the data (PD0, PD1, PD2 or PD3) to be stored in register ZPR1. For example, when the mounted lens has the focal length of 40 mm, data PD1 is stored in register ZPR1. Then, at step #46, the maximum and minimum distances for providing a sufficient light to the object are calculated using equations (1) and (2) described above in connection with step #35. Thereafter, at step #47, register TIR is reset, and at step #48, the timer starts to count up the predetermined time, such as 10 minutes, as described above. Then, at step #49, the timer interruption is permitted and at step #50, the $\overline{IT1}$ interruption is permitted. Thereafter, the program returns to the main routine. Thus, whenever the $\overline{IT1}$ interruption is carried out, that is, whenever the data transmission between the camera circuit and the flash circuit is carried out, microcomputer MCF continues to operate for 10 minutes from that data transmission.

Referring to FIG. 3e, the procedure of the timer interruption is shown. When the timer provided in microcomputer MCF counts every predetermined unit time, such as 1 second, the timer interruption starts, no matter what operation carried out in the main routine. In other words, according to the present embodiment, the timer interruption is carried out at the beginning of every second.

At step #51, "1" is added to the content of register TIR. And, at step #52, it is detected whether or not the content of register TIR is equal to a value Tc (258 in hexadecimal numbering system, and 600 in decimal numbering system) which is substantially equal to 10 minutes. If it is not equal to the value Tc, the program returns to the main routine, and if it is equal to the value Tc, the program goes to step #53. At step #53 transistor BT1 is turned off to cut off the power to step-up circuit DD which charges the main capacitor CM, and then at step #54, motor MO for moving lens FLE is turned off. Furthermore, at step #55, the display in display device ZDP is erased. Then, after permitting the IT0 interruption, the program ends to stop the operation of the microcomputer MCF.

2. Modifications

Figure 4:
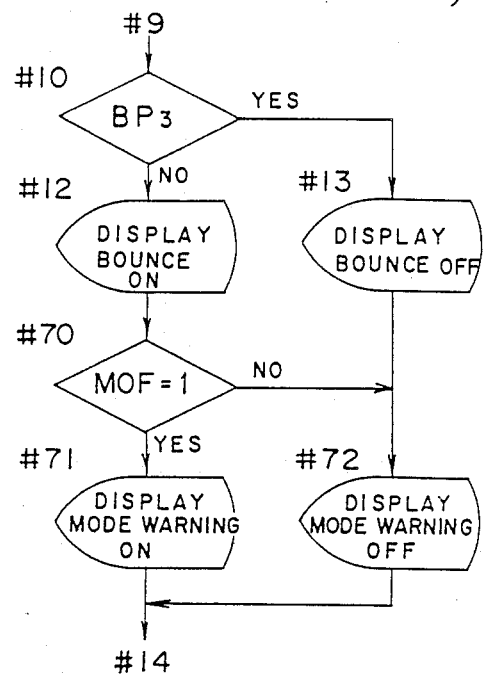
FIG. 4 illustrates a first modification of a flow chart of a portion of the flow chart shown in FIG. 3.

Referring to FIG. 4 a modification of a flow chart of FIG. 3a between steps #9 and #14 is shown. In FIG. 4, only the steps which differ from the above described embodiment are shown and, more particularly, steps for producing a warning sign on the display under the bounce flash mode while under the automatic mode are shown.

At step #10, when it is detected that code plate BOD is not producing data BP3 indicating the flash head is pivoted to the bounce flash mode, the bounce flash mode is indicated at step #12. Here, step #11 is eliminated. Thus, even under the bounce flash mode, it is possible to select the automatic mode. Then, at step #70, it is detected whether or not the register for flash MOF is carrying "1", i.e., whether or not the automatic mode is selected. If yes, the program goes to step #71 to display a mode warning, because under the bounce flash mode, the relationship between the focal length of the mounted lens and the angle of the cone of flash light is very weak and, therefore, it is preferable to change the position of lens FLE, not automatically, but manually. Therefore, under the bounce flash mode and if automatic mode is selected, lens FLE may be moved automatically with respect to the change of the focal length, but meaningless from the viewpoint of photography. Thus, in such a case, a mode warning is produced.

On the contrary, at step #70, if it is detected that the manual mode is selected, such a mode selection is preferred. Thus, in this case, no warning is necessary. Therefore, the program goes to step #72 to cancel the mode warning display and, thereafter, the program goes to step #14 (FIG. 3a).

Even in the above described modification, it is needless to say that the position of lens FLE is maintained the same before and after the pivot movement of the flash head. In other words, lens FLE does not change the position by pivoting the flash head.

In the previous embodiment and modification, the lens FLE can be so positioned, at the most, to widen the emitting angle of the flash light, so wide as to cover the frame of a 28 mm lens. However, when a further wide angle lens, such as a 20 mm lens, is mounted, it is necessary to further widen the emitting angle of the flash light. To this end, a wide panel adapter WP (FIG. 7) is available which is mounted in front of lens FLE to widen the emitting angle of the flash light.

In this case, if the flash device is in the manual mode, and if lens FLE is moved out to a position either PD1, PD2 or PD3, that is if lens FLE is not at the home position PD0, it is meaningless to provide wide panel adapter WP. In other words, wide panel adapter WP should be used under the condition that lens FLE realizes the widest emitting angle. To this end, a panel detector 50 (FIG. 7) is provided in a frame carrying lens FLE. When wide panel adapter WP is mounted, a projection 52 on the panel pushes panel detector 50 to close switch 50a which produces a mount-indication signal indicating that wide panel adaptor WP is mounted. The mount-indication signal is used in the control operation of microcomputer MCF in the following manner.

In FIG. 3a, after steps #12 and #16, and before step #17, a new step is inserted to detect whether or not the mount-indication signal is present. If the mount-indication signal is present, the data representing the home position PD0 is stored in register ZPR2 to forcibly move lens FLE to the home position PD0. Thereafter, the program skips to step #29. If the mount-indication signal is not present, the program goes to step #17. Accordingly, under the manual mode with the flash head located at the direct flash mode, if wide panel adaptor WP is mounted, lens FLE will be set automatically to the home position, thereby emitting the flash light at a wide angle sufficient to cover the 20 mm lens. When wide panel adaptor WP is used, it is preferable to display not "28 mm", but "20 mm" for the indication of the 20 mm lens mounted on the camera body.

Furthermore, after step #42 (FIG. 3d), a new step should be inserted to detect whether or not the mount-indication signal is present. If the mount-indication signal is present, the warning signal should be reset.

Furthermore, after step #19, a step is inserted to detect whether or not the mount-indication signal is present, so as to detect whether or not the wide panel adaptor is mounted. If it is detected that the wide panel adaptor is mounted under the bounce flash mode such that the flash head is pivoted 65°, i.e., the angle data is BP2, the position of lens FLE should be restricted as indicated in Table 5 below, in which an X represents an improper choice and an O represents a proper choice.

TABLE 5

| Focal | (Angle data BP2) | | | |
| Length (f) | Position of Lens FLE | | | |
| | PD0 | PD1 | PD2 | PD3 |
| --- | --- | --- | --- | --- |
| 28–35 mm | X | X | X | O |
| 35–50 mm | X | X | O | O |
| 50–70 mm | X | O | O | O |
| above 70 mm | O | O | O | O |

Also, if it is detected that the wide panel adaptor is mounted under the bounce flash mode such that the flash head is pivoted 75°, i.e., the angle data is BP1, the position of lens FLE should be restricted as indicated in Table 6 below.

TABLE 6

| Focal | (Angle data BP1) | | | |
| Length (f) | Position of Lens FLE | | | |
| | PD0 | PD1 | PD2 | PD3 |
| --- | --- | --- | --- | --- |
| 28–35 mm | X | O | O | O |
| 35–50 mm | O | O | O | O |
| 50–70 mm | O | O | O | O |
| above 70 mm | O | O | O | O |

In the above cases, instead of restricting the choice, it is possible to permit all the possible choices but to produce a warning signal when the choice indicated by the X is selected.

On the contrary, under the automatic mode, no problem will arise when the wide panel adaptor is mounted. When the camera lens having a focal length less than 28 mm is mounted, usually the operator mounts a wide panel adaptor. In this case, the data PD0 is transmitted from the camera circuit to the flash circuit. Therefore, the flash circuit automatically sets lens FLE to the home position (steps #41, #42 and #45). Thus, under the automatic mode, it is not necessary to ascertain that lens FLE is located at the home position when the wide panel adaptor is mounted.

Instead of the wide panel adaptor, it is possible to employ an umbrella type reflector, such as disclosed in Japanese Patent Publication No. 54-160321, published Dec. 18, 1979. When this type of reflector is employed, it is not necessary to change the position of lens FLE with respect to the change of focal length of the camera lens. The lens FLE can be set to any desired position. To detect whether or not the reflector is mounted, a suitable detecting switch may be provided in the flash device to produce a reflector-on signal. The reflector-on signal may be used in the operation of the microcomputer MCF such that, after step #9, a step to detect whether or not the reflector-on signal is present is inserted. If the reflector-on signal is present, the flash device is automatically set to the manual mode (MOF=0) and, thereafter, the program goes to step #17. Then, after step #18 for changing the lens position, the program jumps to step #29. By the above operation, lens FLE may be positioned to any desired position PD0, PD1, PD2 or PD3 without any restriction.

In the case where the flash device is in the bounce flash mode or when the reflector is mounted, the indication of the shooting distance range, as carried out at step #59 (FIG. 3c) in the previous embodiment, is meaningless, because the shooting distance range may vary with respect to various factors, such as the distance to the ceiling, reflectivity of the ceiling, etc. Thus, when it is detected that the bounce flash mode is selected, or when the reflector is mounted, only the display of "charge completed" is effected at step #59.

Figure 5:
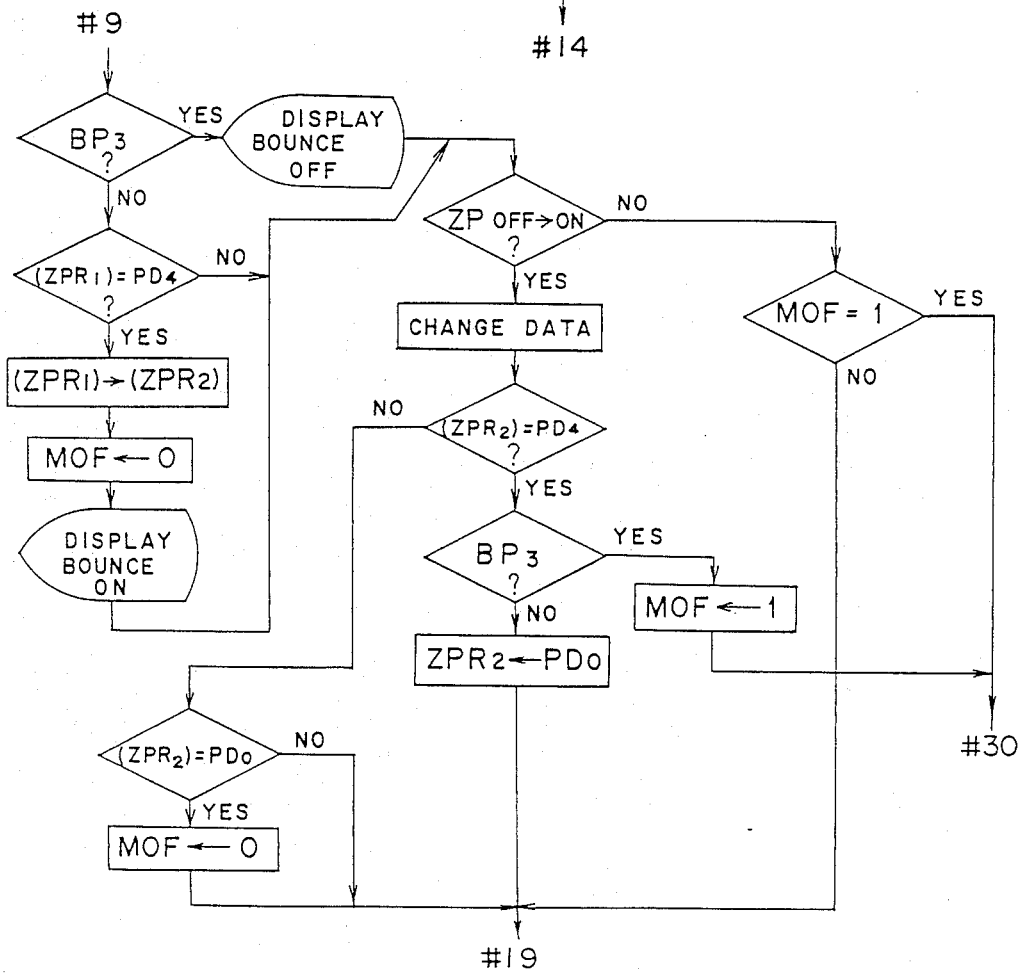
FIG. 5 illustrates a second modification of a flow chart of a portion of the flow chart shown in FIG. 3.

Referring to FIG. 5, another modification is shown. According to the embodiment described above, the change between the automatic mode and the manual mode is effected by switch ZM, whereas the change in the position of lens FLE under the manual mode is effected by switch ZP. In the modification, only one switch ZP is provided which can change the mode between automatic and manual modes and also can change the position of lens FLE. In this modification, steps #14, #15 and #16 are deleted. Thus, at step #17, it is detected, whether or not switch ZP is turned from OFF to ON. If switch ZP is maintained in the OFF state or ON state, the present mode is detected. If the detected mode is the automatic mode, the program goes to step #30, and if it is the manual mode, the program goes to step #19. If switch ZP is changed from OFF to ON, the data stored in register ZPR2 is changed.

Under this modification, the data that can be stored in register ZPR2 are not only PD0, PD1, PD2 and PD3 but also a dummy data PD4. Also, the data in register ZPR2 will change sequentially in the order of PD0, PD1, PD2, PD3, PD4, PD0, PD1, PD2, PD3, PD4 and so on, in response to each change of switch ZP from OFF to ON.

If the data stored in register ZPR2 is PD4, it is detected whether the flash head is pivoted to the bounce flash mode or whether it is in the direct flash mode. If the flash head is in the direct flash mode, a "1" is set in flag MOF so as to set the flash device in the automatic mode. Thereafter, the program goes to step #30. If the flash head is in the bounce flash mode, register ZPR2 will be stored with data PD0. Thereafter, the program goes to step #19.

If the data stored in register ZPR2 is other than PD4, it is further detected whether the data in register ZPR2 is PD0. If the data in register ZPR2 is PD0, the mode should be changed from automatic mode to manual mode. Therefore, an "0" is set in flag MOF. Thereafter, the program goes to step #19.

If the data stored in register ZPR2 is neither PD4 nor PD0, the mode should be maintained in the manual mode. Therefore, the program goes to step #19. At step #10, if it is detected that the flash head is pivoted to the bounce flash mode, it is further detected whether or not the data stored in register ZPR2 is data PD4. If the data stored in register ZPR2 is PD4, the data stored in register ZPR1 is shifted to register ZPR2 and, then, a "0" is set in flag MOF. Thereafter, the program goes to step #12. On the contrary, if the data stored in register ZPR2 is not PD4, the program goes to step #17.

According to the above-described modification, even if the flash head is pivoted to the bounce flash mode while the flash device is in the automatic mode, the position of lens FLE will not move during such a pivotal movement of the flash head.

Referring to FIGS. 6a, 6b, 6c and 6d, yet another modification is shown. This modification is for producing a warning signal. Under the condition that the flash head is in the direct flash mode while the flash device is in the manual mode, there may be a case when the lens mounted on the camera body is a wide angle lens, whereas the lens FLE on the flash head is so extended to narrow the angle of the cone of flash light, thereby providing the flash light only in the center portion of the photographing frame. In such a case, a warning is produced.

For this modification, a flag DRF is provided which indicates whether or not the flash circuit has received the data of focal length from the camera circuit. If the focal length data is transmitted from the camera circuit to the flash circuit, a "1" is set in flag DRF. If not, then, "0" is set in flag DRF. Thus, at step #92 (FIG. 6c), when the data transmission to the flash circuit starts in response to the signal applied to terminal $\overline{IT1}$ for starting the $\overline{IT1}$ interruption, a "1" is set in flag DRF. A "0" is set in Flag DRF when the power is supplied (FIG. 6b) or when the operation ends (FIG. 6d) after counting 10 minutes by the timer.

In FIG. 3b, at step #19, #20 or #21, when it is detected, respectively, that the angle data is either BP0, BP1 or not BP2, it is detected at step #80 (FIG. 6a) whether or not the angle data is BP3 representing the direct flash. If it is not BP3, the warning display is canceled at step #83 and, thereafter, the program goes to step #29. At step #80, if it is detected that the angle data is BP3, it is detected at step #81 whether the flag DRF is carrying "1" or not. As described above in connection with FIG. 6c, the flag DRF will carry "1" when the $\overline{IT1}$ interruption is carried out to transmit data from the camera circuit. If the flag DRF is carrying "0", the program goes to step #83, but if it is carrying "1", the program goes to step #82. At step #82, it is detected whether the data stored in register ZPR1 is PD3 or not. If register ZPR1 is carrying the data PD3, indicating that the focal length of the mounted camera lens is greater than 70 mm, the program goes to step #83 to cancel the warning display, because no matter where lens FLE is positioned, the light emitted from the flash head will cover the entire photographing frame. If register ZPR1 is carrying a data other than PD3, the program goes to step #84 for detecting whether or not the data stored in register ZPR1 is a data PD2. If register ZPR1 is carrying the data PD2 indicating that the focal length of the mounted camera lens is between 50 mm and 70 mm, the program goes to step #85 to detect whether or not the position of lens FLE is at the third extended position (corresponding to data PD3 stored in register ZPR2, as indicated in Table 1). If lens FLE is in the third extended position, the program goes to step #90 to effect the warning display, because the emitted light will not be able to cover the entire photographing frame. At step #85, if the result of the detection is no, meaning that lens FLE is located at a position other than the third extended position, the program goes to step #83 to cancel the warning display, because in this case, the emitted light will cover the entire photographing frame.

A similar operation is carried out in steps #86 to #89, and when the combinations indicated by Xs in Table 4 are detected, the warning display is effected to show that the emitted light will not cover the entire photographing frame. When the combinations indicated by Os in Table 4 are detected, the warning display is canceled. Thereafter, the program goes to step #29.

In the above described modification, instead of effecting the warning display, it is possible to prohibit the selection of the improper choices. To this end, at step #85, when it is detected that register ZPR2 is carrying data PD3, the data in register ZPR2 is forcibly changed to PD2. Similarly, at step #87 or #88, when it is detected that the data stored in register ZPR2 is PD3 or PD2, respectively, the data in register ZPR2 is forcibly changed to PD1. Also, at step #89, if it is detected that the data stored in register ZPR2 is not PD0, the data in register ZPR2 is forcibly changed to PD0.

In the above described embodiment and modifications, under the automatic mode, when no camera lens is mounted, the focal length data of the camera lens previously mounted is transmitted to the flash circuit. Thus, even when the camera lens is removed, lens FLE stays in the same position. Furthermore, when no camera lens is mounted, it is meaningless to produce the warning signal or to restrict the operation. Therefore, when no camera lens is mounted, a signal indicating "no camera lens" is transmitted to the flash circuit. When the flash circuit receives the "no camera lens" signal, microcomputer MCF should be so programmed as to carry "0" in flag DRF.

In a similar manner to the case where the wide panel adaptor is mounted, an operation program where a tele-panel adaptor is mounted should be prepared. To this end, another panel detector similar to panel detector 50 (FIG. 7) is provided in the flash device for producing a mount-indication signal II indicating that the tele-panel adaptor is mounted. The mount-indication signal II is used in the control operation of microcomputer MCF in the following manner. When the mount-indication signal II is detected, the lens position data PD3 is forcibly stored in register ZPR2 and, thereafter, the program goes to step #29, so as to forcibly locate lens FLE to the third extended position. In this case, the display on the flash device for displaying the angle of the cone of light should not be 70 mm, but should preferably be some other indication which corresponds to the case where the tele-panel adaptor is mounted. Also, in this case, when the flash head is pivoted to the bounce flash mode, the object to be photographed will not be illuminated directly by the flash light. Thus, it is not necessary to produce any warning.

According to the above description, when a wide panel adaptor or a tele-panel adaptor is put on, lens FLE is forcibly moved to the home position or the third extended position, respectively. Instead of forcibly moving lens FLE to the ultimate ends, it is possible to permit lens FLE to stay at the intermediate positions, but to change the display of the angle of the cone of the flash light when the wide panel adaptor or tele-panel adaptor is mounted. Also, when a wide panel adaptor or a tele-panel adaptor is put on, the display of the shooting distance range should preferably be changed.

In the above described embodiment or modifications, the data representative of the field angle and the bounce angle are displayed. In displaying the field angle, it is possible to make the display of the desired field angle blink before the desired field angle is realized by the movement of lens FLE. When the lens movement of FLE is completed to realize the desired field angle of illumination, the blink stops to effect the continuous display of the desired field angle (i.e., the focal length). When this arrangement is employed, it is possible to detect immediately whether a realization of the field angle on display has been completed or the movement of the lens FLE continues. Also, a continuation of the blinking also serves as a warning signal for the warning that the lens movement cannot realize the desired field angle and the flash light will not cover the entire photographing frame. To this end, before step #32, a step is inserted to effect the blinking of the data on the display. Also, at step →, instead of producing a warning, the indication "28 mm" on the display should blink. For example, the indication in a display 56 (FIG. 7) blinks in a manner described above.

According to the above described embodiment or modifications, the change in the angle of the flash head for the bounce flash is detected by the calculation carried out step-by-step based on the signal from the detector, such a detection can be carried out more easily. To this end, a suitable detecting switch, such as a touch switch 54 (FIG. 7) is provided at least on one side of the flash head for producing a pressure signal when one grabs the flash head to pivot the flash head up and down. Before step #31 and after steps #29 and #30, a step is inserted for detecting the pressure signal. If the pressure signal is not present, the program goes to step #31, but if it is present, the program jumps to step #36. When this arrangement is employed, it is possible to prohibit the movement of lens FLE while the pressure signal is present, i.e., while the flash head is being pivoted.

Furthermore, according to the above described embodiment or modifications, the data stored in register ZPR1 representing the focal length of the mounted camera lens is compared with the data stored in register ZPR2 representing the position of lens FLE, so as to produce a warning signal or to restrict the combination. In the case where the flash circuit does not have a means to read data of the focal length of the mounted camera lens, it is possible to make, when the bounce flash mode (BP2) is selected, the flash device to prohibit the positioning of lens FLE at PD0 or PD1, or to permit the positioning of the lens FLE at PD0 or PD1, but with a warning.

Also for the modification described above in connection with FIG. 4, in which modification the automatic mode is maintained even when the flash head is pivoted to the bounce flash mode, it is preferable to prohibit the setting of a wider field angle of illumination or to produce a warning when the flash light directed to the ceiling partly directly illuminates the object to be photographed.

In the above described embodiment and modifications, the angle of the cone of flash light is changed by the movement of lens FLE in and out. Instead, it is possible to change the same by the use of a liquid crystal plate positioned in front of the xenon tube. By changing the voltage or current applied to the liquid crystal plate, the angle of the cone of flash light may be changed. An example of such a liquid crystal plate is disclosed in Japanese Patent Publication No. 52-3576 published Jan. 28, 1977.

Furthermore, according to the present invention, lens FLE may be moved not only by drive circuit MD, but also directly by the manual pushing and pulling force.

Also, it is to be noted that the warning may be produced not only of the type which can change the angle of the cone of flash light, but also of the type which can not change the angle of the cone of flash light.

According to the present invention, since lens FLE does not move while the flash head is pivoted, various problems as discussed above can be eliminated.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A flash device for use in flash photography and capable of being informed of digital focal length data representing a focal length of a lens mounted on a camera, said flash device comprising:
   light emitting means for emitting a flash light;
   changing means for changing the angle of the cone of said flash light;
   means for serially reading digital focal length data transmitted from said camera;
   selection means for selecting, based on said digital focal length data, a digital data representing an angle of the cone of said flash light covering the angle of view corresponding to said digital focal length data;
   means for controlling said changing means in response to the output of said selection means; and
   warning signal producing means for producing a warning signal when said digital focal length data is representative of an angle of the cone of said flash light which exceeds a limit angle of the cone of said flash light which said changing means can provide;
   said selecting means setting said changing means to a condition for providing the limit angle of the cone of said flash light when said warning signal is produced.

2. A flash device as claimed in claim 1, further comprising:
   means for displaying data representative of the condition of said changing means; and
   means for providing a warning through said displaying means when said warning signal is produced.

3. A flash device as claimed in claim 1, wherein the limit angle of the cone corresponds to the widest angle of the cone.

* * * * *